No. 870,530. PATENTED NOV. 5, 1907.
F. B. COOK.
INDIVIDUAL PROTECTOR UNIT.
APPLICATION FILED FEB. 11, 1907.

WITNESSES:
Frederick R. Parker
A. Oy Cook

INVENTOR:
Frank B. Cook.

UNITED STATES PATENT OFFICE.

FRANK B. COOK, OF CHICAGO, ILLINOIS.

INDIVIDUAL PROTECTOR UNIT.

No. 870,530.  Specification of Letters Patent.  Patented Nov. 5, 1907.

Original application filed Jan. 18, 1906. Serial No. 296,714. Divided and this application filed February 11, 1907. Serial No. 356,881.

*To all whom it may concern:*

Be it known that I, FRANK B. COOK, a citizen of the United States of America, residing at Chicago, in the county of Cook and State of Illinois, have invented a new and useful Individual Protector Unit, of which the following is a specification, reference being had to the accompanying drawings, illustrating same.

This application is a division of my application for Letters Patent on cable terminal and system of protection, Serial No. 296,714.

My present invention relates to electrical protectors, and in particular to such protectors comprising fuses and lightning arresters.

The principal objects of my invention are to provide a compact and simplified protector unit adapted to be mounted on cable terminals or in other suitable places, for protecting lines of the system; to provide a substantial construction in such a protector unit and means for readily mounting same in place.

Other objects will be apparent from the following specification.

In my present invention I have devised an individual protector unit adapted to be mounted singly on a cable terminal to accommodate a pair of wires of the cable which are to be immediately placed in service. The wires of the cable which are not to be used until some later time, are preferably left deadended and are not provided with protection. As other wires of the cable are put into service, more individual protector units may be mounted on the cable terminal to correspond with and protect the new wires. With this arrangement I can distribute a cable in multiple, at several different points, and use protection for each pair of the wires distributed, at one point only, where the pair is to be carried off to the drop-wires. If it is desired to change the drop-wires on a certain pair, from one point of distribution to another, the protector unit is also changed from the one point of distribution to the other, along with the drop-wires. It will readily be seen that with such a system the protection used is no more than the protection used on a system without multiple distribution, and that all of the features of a multiple-distribution system are provided.

I will more particularly describe my invention by reference to the accompanying drawings, in which,—

Figure 1:
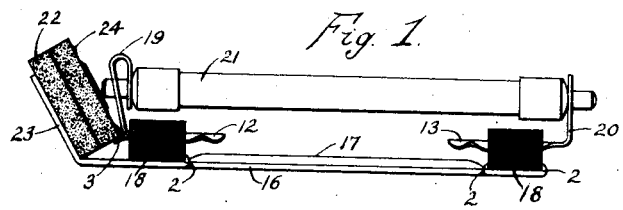
Figure 2:
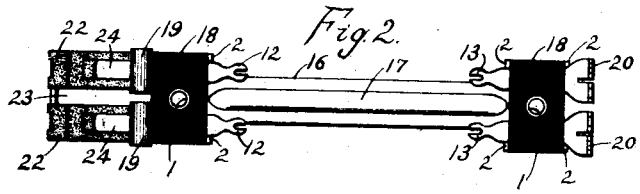

Figure 1 is a side elevation of the individual protector unit of my present invention; and Fig. 2 is a top view of Fig. 1, with the tubular fuses removed.

Like characters refer to like parts in the several figures.

The individual protector unit comprises a sheet-metal supporting strip 16, ribbed as at 17 to stiffen same and to which are mounted suitable insulating blocks 18 18 preferably of hard rubber. The fuse clamping springs 19 and 20 are preferably secured to the hard rubber blocks 18 18 by being forcibly inserted through holes therein, preferably as shown, which construction holds the springs 19 and 20 very rigid. Inclosed fuses 21 21 are suitably pressed into place in connection with springs 19 and 20, preferably as shown. Lightning arresters 22 22 are suitably supported between a bent-up portion 23 of the base strip 16, and contact springs 24 24. Insulating blocks 18 18 are preferably riveted to the base strip 16 by hollow rivets 1, 1 which are adapted to receive screws for mounting the protector unit in place. The insulating blocks 18 18 are kept from turning upon the mounting strip 16 by prongs 2 2 formed out of the strip 16. When the fuses 21 21 are removed from springs 19 20, the protector unit may be readily mounted in place by two screws inserted through hollow rivets 1, 1. The circuit conductors may be soldered or otherwise secured to the terminals 12 13. Each spring 24 has a portion 3 formed thereon to provide a stop for one of the electrodes of its lightning arrester 22. The spring clamping means for the inclosed fuses 21 21 will be readily understood without further detailed description here.

I do not wish to limit this invention to the particular details of construction as shown in the drawings, as many modifications may be made therein without departing from the spirit of the invention.

What I claim as my invention and desire to secure by Letters Patent, is—

1. An individual protector, comprising a sheet-metal base, insulating portions secured to one side of the said base, spring members carried by the said insulating portions and inserted through holes therein, and suitable fuses and lightning arresters held in place by the said spring members.

2. An individual protector comprising a ribbed sheet-metal base, insulating portions, tubular rivets securing the said insulating portions to the said base, the said rivets being adapted to receive mounting screws, spring members rigidly secured to the said insulating portions, inclosed fuses carried by the said spring members, and lightning arresters suitably held between certain ones of the spring members and a portion of the said base.

3. An individual protector unit comprising a sheet-metal base portion, insulating blocks mounted on one side of the base portion, contact springs carried by the insulating blocks, a pair of inclosed fuses suitably clamped in place by the said contact springs, a bent-up portion at one end of the said base portion, and a pair of lightning arresters suitably mounted against the said bent-up portion at one end of the fuses, at an angle with the base portion.

4. An individual protector unit comprising a sheet-metal base portion having a bent-up portion at one end thereof and suitable holes therethrough for mounting same, insulating blocks carried by the said base portion, contact members mounted on one side of the said blocks, a pair of inclosed fuses held in place by some of the said contact members, and a pair of lightning arresters inserted between the said bent-up portion and a pair of the said contact members, at one end of the fuses.

5. An individual protector unit comprising a metallic mounting strip, a pair of tubular fuses mounted substantially parallel with the said strip and lengthwise thereof, a pair of lightning arresters mounted at one end of the fuses, in an upwardly extending position, suitable contact members for holding the fuses and lightning arresters in place, and suitable means for connecting the several protective devices for use.

6. An individual protector unit comprising a sheet-metal mounting plate, insulating blocks secured thereto by hollow rivets adapted to receive screws or bolts for mounting the protector in place, spring contact members carried by the said blocks, and suitable fuses and lightning arresters held in place by the said contact members.

7. An individual protector unit of the character described, comprising a ribbed sheet-metal base having one end portion bent at an angle with the base, insulating blocks secured to the base by hollow rivets adapted to receive mounting screws, prongs on the base portion adapted to prevent the insulating blocks from turning thereon, contact spring members inserted through holes in the insulating blocks to securely mount them in place, inclosed fuses clamped in place by the said contact spring members, and lightning arresters at one end of the fuses held in place between the said contact spring members and the bent-up portion of the said base.

8. An individual protector unit comprising a metallic ground strip, insulating portions carried by the ground strip, suitable contact members carried by the said insulating portions, a pair of fuses carried by the said contact members, substantially parallel with the said strip and lengthwise thereof, a pair of lightning arresters at one end of the said fuses, electrically connected with the said ground strip, and suitable means for connecting the several protective devices for use.

9. An individual protector unit comprising a metallic ground strip, insulating portions carried by the ground strip, suitable contact members carried by the said insulating portions, a fuse carried by the said contact members, substantially parallel with the said strip and lengthwise thereof, a lightning arrester at one end of the fuse, electrically connected with the said ground strip, and suitable means for connecting the fuse and lightning arrester for use.

As inventor of the foregoing, I hereunto subscribe my name in the presence of two subscribing witnesses, this 8th day of February, 1907.

FRANK B. COOK.

Witnesses:
FREDERICK R. PARKER,
CLARENCE E. COOK.

---

Correction in Letters Patent No. 870,530.

It is hereby certified that in Letters Patent No. 870,530, granted November 5, 1907, upon the application of Frank B. Cook, of Chicago, Illinois, for an improvement in "Individual Protector Units," an error appears in the printed specification requiring correction, as follows: On page 1, lines 112 and 113, the words "carried by the said base portion, contact members mounted on one side of" should be stricken out and the following inserted instead, *mounted on one side of the said base portion, contact members carried by;* and that the said Letters Patent should be read with this correction therein that the same may conform to the record of the case in the Patent Office.

Signed and sealed this 3d day of December, A. D., 1907.

[SEAL]

C. C. BILLINGS,
*Acting Commissioner of Patents.*